UNITED STATES PATENT OFFICE.

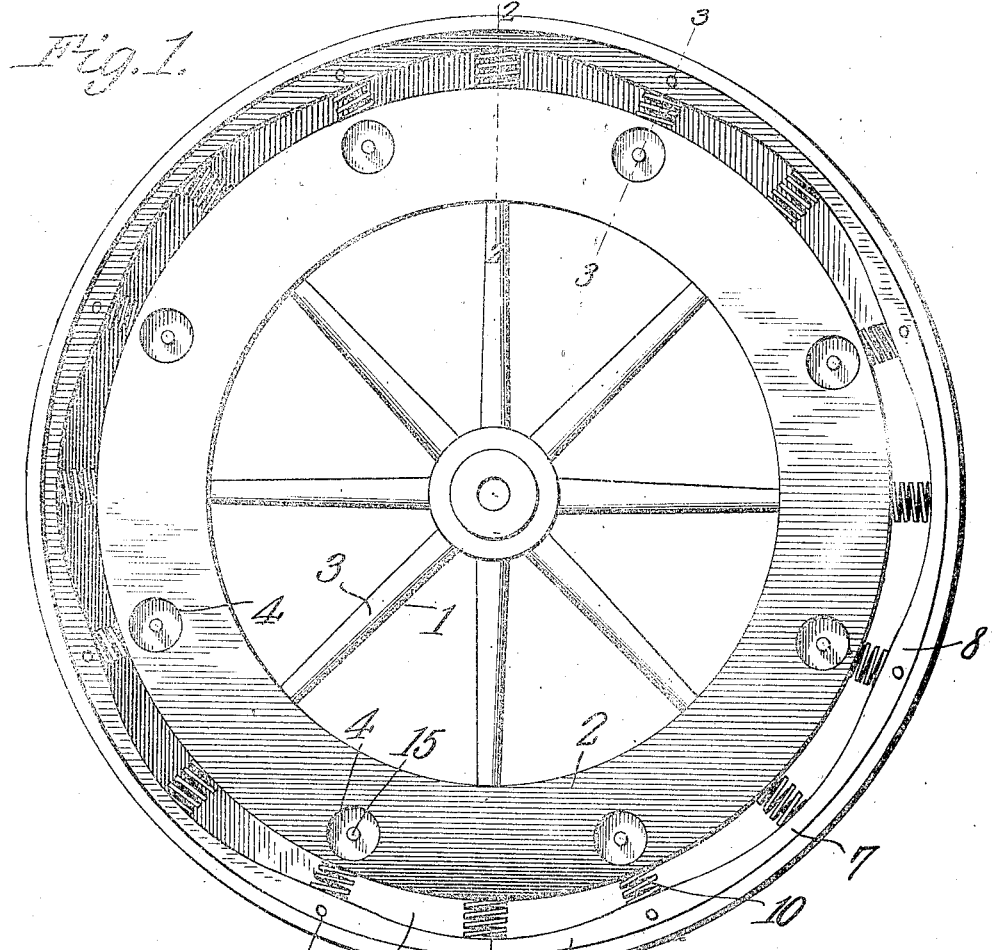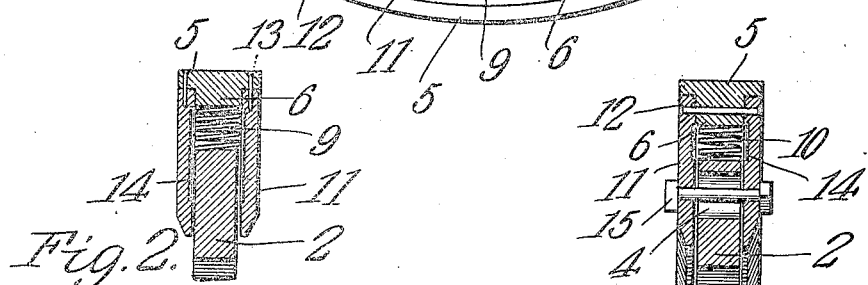

JOHN C. TURNAGE, OF RICHMOND, MISSOURI.

RESILIENT WHEEL.

No. 893,677.

Specification of Letters Patent.

Patented July 21, 1908.

Application filed October 7, 1907. Serial No. 396,284.

*To all whom it may concern:*

Be it known that I, JOHN C. TURNAGE, a citizen of the United States, residing at Richmond, in the county of Ray and State of Missouri, have invented a new and useful Resilient Wheel, of which the following is a specification.

This invention has relation to resilient wheels adapted to be used upon automobiles and the like and it consists in the novel construction and arrangement of its parts as hereinafter shown and described.

The object of the invention is to provide a wheel having resilient qualities and at the same time one of the parts of which are so assembled that the interior of the wheel cannot rotate to an excessive degree with relation to the exterior or periphery of the wheel. While it is necessary that the interior of the wheel may be permitted to have slight axial movement with relation to the periphery of the wheel in order to gain the desired resiliency yet in the present construction positive means is provided for limiting the relative axial movement of the two said parts of the wheel. The parts are so assembled that the resilient elements of the wheel are protected from mud, dust etc.

In the accompanying drawing:—Figure 1 is a side elevation of the wheel with one of its side plates removed. Fig. 2 is a transverse sectional view of a portion of a wheel rim cut on the line 2, 2 of Fig. 1 and, Fig. 3 is a transverse sectional view of a portion of the wheel rim cut on the line 3, 3 of Fig. 1.

The wheel 1 is provided with a felly 2 which is relatively broad in side elevation and which is provided at regular intervals occurring midway between the spokes 3 with the transversely disposed perforations 4. The tire 5 is spaced from the rim 2 and is provided upon its inner side with an annular web 6 which lies in the same plane as that occupied by the rim 2. Said web 6 is provided with an irregular inner edge which gives the web in side elevation the thinner portions 7 and the thicker portions 8 which are alternately arranged with the thinner portions occurring opposite the ends of the spokes 3 and the thicker portions 8 occurring adjacent the perforations 4 of the rim 2. The coil springs 9 are interposed between the thinner portions 7 of the web 6 and the periphery of the rim 2 and are in alinement with the wheel spokes 3. The coil springs 10 are interposed between the thicker portions 8 of the web 6 and the periphery of the wheel rim 2. The springs 9 are longer than the springs 10. The side plates 11 are of annular configuration and are secured to the web 6 by bolts or rivets 12 passing transversely through the said plates and the thickened portions 8 of the web 6. The rivets 13 pass through the tire 5 and enter the plate 11 and form additional securing means for the same.

The inner sides of the plates 11 are radially recessed as at 14 which recesses of varying length are adapted to receive the sides of the springs 9 and 10 when the same are expanded laterally as a consequence of weight applied thereto. The bolts 15 pass transversely through the plates 11 and the perforations 4 of the rim 2. Said perforations are of greater diameter than said bolts consequently they permit a limited amount of movement of the bolts.

From the foregoing description it is obvious that a resilient wheel is provided which possesses an interior portion adapted to have a limited amount of axial movement with relation to an exterior portion. It will also be seen that the resilient members are mounted and effectually housed between the inner and outer portions of the wheel. As the springs mounted between the two said portions of the wheel are expanded as a consequence of weight applied to the wheel they will enter the recesses provided upon the inner side of the plates 11 and will form a resilient means tending to hold the inner and outer parts of the wheel in their proper normal relations and against relative axial movement. The bolts 15 passing through the perforations 4 in the rim 2 constitute a means for positively limiting the relative axial movement of the inner and outer parts of the wheel, as such movement is checked when the said bolts come in contact with the edges of the said perforations.

Having thus described my invention, what I claim as new and desire to secure by Letters-Patent is:—

1. A wheel having a rim provided with transversely disposed perforations, a tire surrounding the rim and being spaced from the same, coil springs interposed between the rim and the tire, side plates attached to the tire and having upon their inner sides recesses adapted to receive the coil springs when they are expanded laterally and bolts passing transversely through the side plates and the perforations of the rim.

2. In a wheel a rim having transversely disposed perforations, a tire surrounding the rim and being spaced from the same, said tire having upon its inner side an annular web lying in the same plane as that of the rim coil springs interposed between the web and the rim, short movable side plates fixed to and overlapping the tire and having recesses adapted to receive the coil springs when they are laterally expanded and bolts passing transversely through the side plates and the rim perforations.

3. In a wheel a rim having transversely disposed perforations, a tire surrounding the rim and being spaced from the same, said tire having upon its inner side an annular web having alternately arranged thick and thin portions, coil springs of different length alternately interposed between the rim and the web and being located at the points of greatest and least thickness of the web, short movable side plates attached to the tire and having recesses upon their inner sides adapted to receive the coil springs when they are laterally expanded and bolts passing transversely through the side plates and the perforations of the rim.

In testimony that I claim the foregoing as my own, I have hereto affixed my signature in the presence of two witnesses.

JOHN C. TURNAGE.

Witnesses:
ELMER HANKINS,
E. C. HANKINS.